(12) United States Patent
Wales

(10) Patent No.: US 7,632,033 B2
(45) Date of Patent: Dec. 15, 2009

(54) GRILL BRUSH

(76) Inventor: Michael Wales, 3 W. End Ave., Old Greenwich, CT (US) 06870

( * ) Notice: Subject to any disclaimer, the term of this patent is extended or adjusted under 35 U.S.C. 154(b) by 109 days.

(21) Appl. No.: 12/019,357

(22) Filed: Jan. 24, 2008

(65) Prior Publication Data

US 2008/0178404 A1 Jul. 31, 2008

Related U.S. Application Data

(60) Provisional application No. 60/886,498, filed on Jan. 24, 2007.

(51) Int. Cl.
 *A47L 13/26* (2006.01)
(52) U.S. Cl. .................... 401/37; 401/39; 401/270; 401/291; 401/131
(58) Field of Classification Search ............ 401/16, 401/23–26, 37, 39, 270, 276, 280, 281, 282, 401/291, 131
 See application file for complete search history.

(56) References Cited

U.S. PATENT DOCUMENTS

| | | | |
|---|---|---|---|
| 2,630,594 A | 3/1953 | Fisher | |
| 2,772,430 A * | 12/1956 | Moritt | ............ 401/151 |
| 4,826,340 A | 5/1989 | Rothweiler | |
| 6,250,833 B1 | 6/2001 | Perry | |
| 6,425,701 B1 | 7/2002 | Jacobs | |
| 6,443,646 B1 | 9/2002 | MacDonald | |
| 6,962,456 B2 | 11/2005 | Larsen | |
| 7,040,830 B2 | 5/2006 | Kliegman | |
| 7,047,590 B2 * | 5/2006 | Neal et al. | ............ 15/111 |
| D567,511 S * | 4/2008 | Borovicka et al. | ........ D4/129 |
| 2004/0105715 A1 | 6/2004 | Spelman | |
| 2004/0265042 A1 | 12/2004 | Chan | |
| 2005/0069375 A1 | 3/2005 | Kliegman | |

* cited by examiner

*Primary Examiner*—David J Walczak
(74) *Attorney, Agent, or Firm*—St. Onge Steward Johnston & Reens LLC

(57) ABSTRACT

A grill brush comprising a handle, with a handle end and a brush head end; a hanging means attached a handle end of the handle; a reservoir located within the handle; a reservoir cap located on the handle; a brush head attached to the brush head end of the handle; the brush head comprising: a brush head bracket, a bristle base; a plurality of orifices for fluid distribution located in the bristle base; a plurality of bristles located on the bristle base; a scraper attached to the brush head; a distribution passageway in the handle, and in fluid communication with the orifices; an inlet valve located in the handle, and in fluid communication with the reservoir and the distribution passageway; a shut-off spool located on the handle, and in operable communication with the inlet valve; an anchor attached to the bristle base; a hole located in the brush head bracket configured to slide over the anchor; an attaching means attachable to the anchor, and configured to hold the bristle base to the brush head bracket; a gasket configured to fit between the bristle base and the brush head bracket, and further configured to prevent leaking of fluid from the brush head other than the orifices; an air bleed valve located in the reservoir cap; an o-ring gasket configured to fit between the distribution passage way and the brush head bracket.

9 Claims, 8 Drawing Sheets

US 7,632,033 B2

GRILL BRUSH

CROSS-REFERENCES

This patent application claims the benefit of provisional patent application Ser. No. 60/886,498 by Michael Wales, entitled "Grill Brush", filed on Jan. 24, 2007, the entire contents of which are fully incorporated by reference herein.

TECHNICAL FIELD

The present invention relates to grill brushes and more particularly relates to a new grill brush for cleaning the grates of a grill while also applying a cleaning fluid.

BACKGROUND

The present invention pertains to grill brushes for cleaning grill grates such as the grates of gas fired barbecue grills, and charcoal fired barbecue grills.

The use of brushes and scrapers for the cleaning of grill grates of gas grills is well known. Typically, grill brushes have a head portion and a handle portion. Grill brushes known in the art typically have metallic bristles, which are generally all of a constant length and form a generally planar abrasive surface. This bristle configuration permits the top surface of the grill to be scrubbed with the grill brush but does not facilitate the cleaning of the sides of the grill grate bars. With known grill brushes it is therefore difficult to remove accumulated deposits from the sides of the grate bars without significant effort.

It would therefore be desirable to have a grill brush that more effectively removes deposits and grease from the sides of the grate bars of a grill grate while also removing deposits from the top surface of the grate. In addition, it is desirable to have a grill brush that can be used to clean the inside and outside of a grill, and remove deposits from hard to reach crevices.

SUMMARY

The disclosed invention relates to a grill brush comprising a handle, with a handle end and a brush head end; a hanging means attached a handle end of the handle; a reservoir located within the handle; a reservoir cap located on the handle; a brush head attached to the brush head end of the handle; the brush head comprising: a brush head bracket, a bristle base; a plurality of orifices for fluid distribution located in the bristle base; a plurality of bristles located on the bristle base; a scraper attached to the brush head; a distribution passageway in the handle, and in fluid communication with the orifices; an inlet valve located in the handle, and in fluid communication with the reservoir and the distribution passageway; a shut-off spool located on the handle, and in operable communication with the inlet valve; an anchor attached to the bristle base; a hole located in the brush head bracket configured to slide over the anchor; an attaching means attachable to the anchor, and configured to hold the bristle base to the brush head bracket; a gasket configured to fit between the bristle base and the brush head bracket, and further configured to prevent leaking of fluid from the brush head other than the orifices; an air bleed valve located in the reservoir cap; an o-ring gasket configured to fit between the distribution passage way and the brush head bracket, and further configured to prevent the leakage of fluid from the intersection of distribution passage way and the brush head bracket.

BRIEF DESCRIPTION OF THE DRAWINGS

The present disclosure will be better understood by those skilled in the pertinent art by referencing the accompanying drawings, where like elements are numbered alike in the several figures, in which.

DETAILED DESCRIPTION

This patent application is related to patent application Ser. No. 11/566,359 filed on Dec. 4, 2006, by Michael Wales and entitled "Grill Brush", the entire contents of which are fully incorporated by reference herein.

Figure 1:
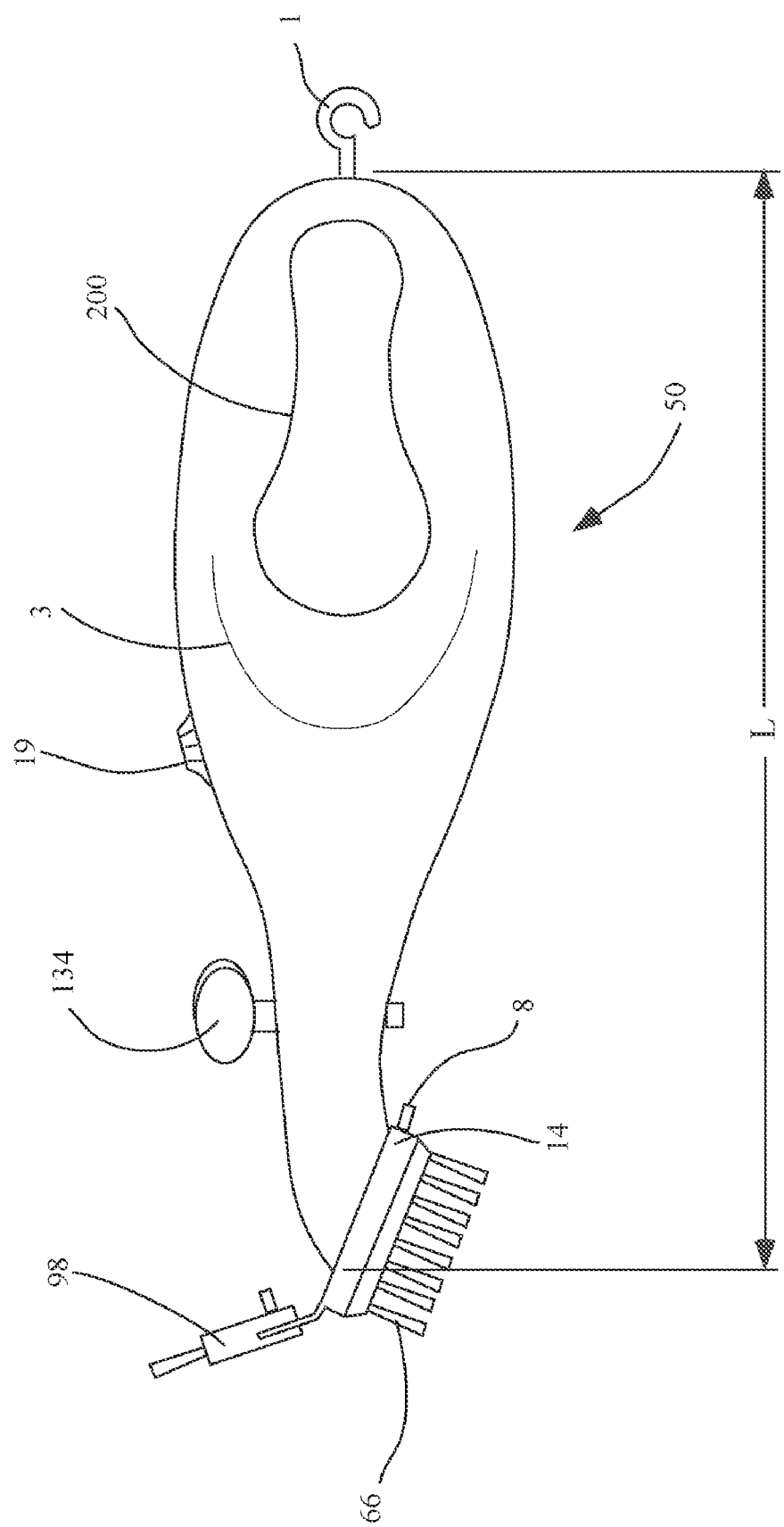
FIG. 1 is a is side view of a disclosed grill brush with an opening located along about ½ the length of the brush handle.

FIG. 1 is a side view of a disclosed grill brush 50. This version of the grill brush 50 may be called a "Grill Baby". The grill brush 50 comprises a handle 3, a hook 1, a reservoir cap 19, a brush head 14, a scraper 98, and a shut-off spool 134. The handle 3 contains a reservoir that is in fluid communication with orifices 58 (not visible in this view) located on the brush bristle surface 64 of the brush head 14. Fluid can be placed in the reservoir via the reservoir orifice located under the removeable reservoir cap 19. The reservoir is in fluid communication with the orifices 58. The fluid can be released from the orifices 58 during cleaning and scraping of the grill to assist in the cleaning of the grill. The fluid may be water, soapy water, or cleaning solution. This embodiment of the grill brush 50 has large opening 200 in the handle 3. The opening 200 is configured to allow a user to insert his fingers into the opening and grip the handle 3. The grill brush handle 3 length may be such that the opening 200 extends to about one half the length "L" of the handle 3.

Figure 2:
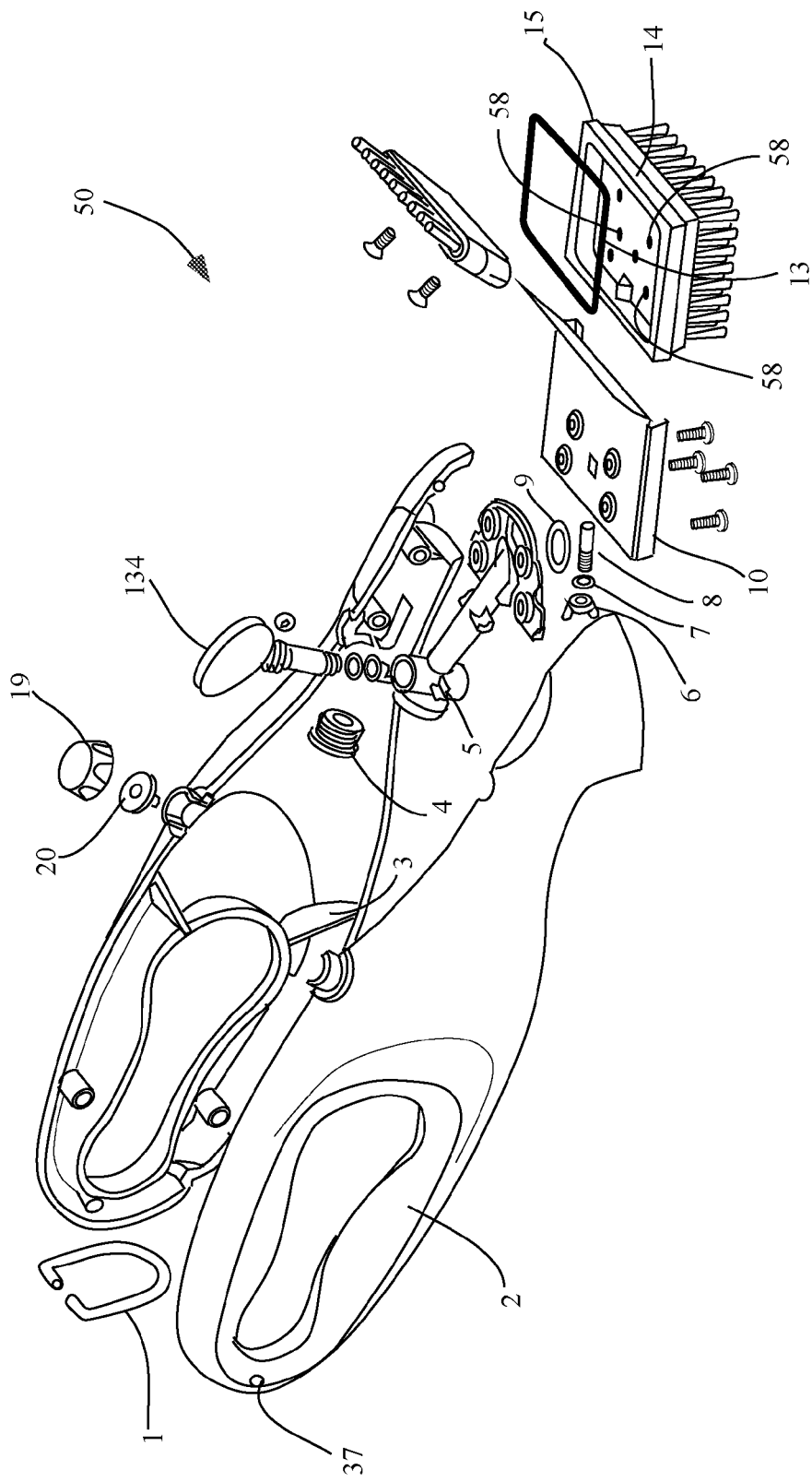
FIG. 2 is an exploded view of the grill brush from FIG. 1.

FIG. 2 shows an exploded view of the grill brush 50. In this embodiment, the hook 1 can rotate about a pivot point 138. The hook 1 can be pressed into an indention 142 in the handle (not shown in this view, shown in FIG. 4) and stored out of the way. The handle 3 contains a fluid reservoir that is configured to hold about ½ cup to about 4 cups of fluid, such as water, soapy water, detergent, cleaner, etc. The brush head 14 comprises several components, a bristle base 15, brush head bracket 10, an anchor 8 attached to the bristle base 15. An inlet valve 4 attaches to a passage way 5 that is in fluid communication with the bristle base 15. The inlet valve 4 allows fluid to flow through the orifices 58 located on the bristle surface 64 of the bristle base 15 (surface 64 not visible in this view) fast enough to provide enough fluid to assist in cleaning the grill brush, but not so fast as to waste an excessive amount of fluid. The distribution passage way 5 is configured to generally evenly distribute fluid to the orifices 58 in the bristle base 15 and is in operable communication with the shut-off spool 134. The shut-off spool 134 is configured to either allow fluid to flow from the reservoir through the orifices 58, or to stop the flow of fluid from the reservoir through the orifices 58. An anchor 8 is molded or otherwise permanently attached to the bristle base 15 (in this view the anchor 8 is shown separated from the bristle base 15 to show how it attaches to the wing nut 6 and washer 7). The brush head bracket 10 has a hole (not visible in this view) where the anchor 8 fits through. If the wing nut 6 is screwed onto the threaded surface of the anchor 8, when the anchor is passed through the hole, the wing nut holds the bristle base 15 snugly in bracket 10. An o-ring gasket 9 is configured to fit between the distribution passage way 5 and the bracket 10, to prevent leaking of fluid from the passage way 5. A gasket 13 is configure to fit between the top of the bristle base 15 and the bottom of the bracket 10 to prevent fluid from leaking out of the interface between the bristle base 15 and brush head bracket 10. An air bleed valve 20 is configured to fit inside the reservoir cap 19. The air bleed valve 20 allows air to enter the reservoir in the handle 3 through a cap orifice 24 when fluid is flowing from the handle 3 into the bristle base 15 and out the orifices 58, thereby preventing a vacuum or low pressure condition from developing in the reservoir and stopping the flow of fluid.

Figure 3:
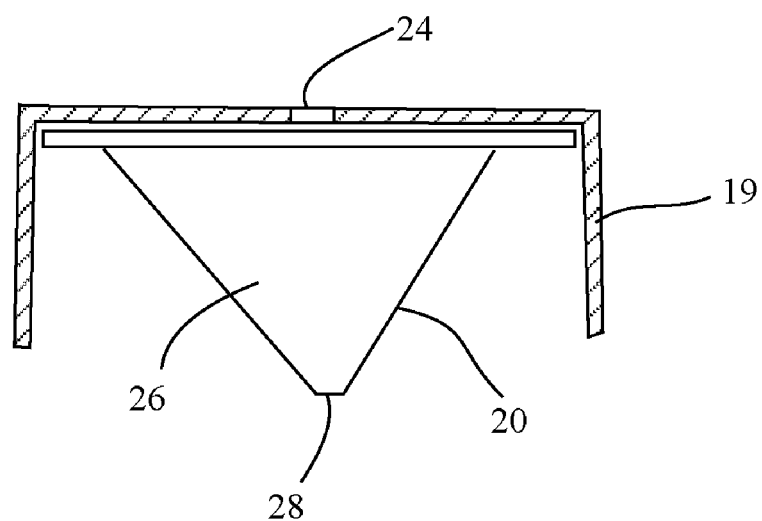
FIG. 3 is a cross-sectional view of the reservoir cap.

FIG. 3 is a close up cross-sectional view of the reservoir cap 19, and air bleed valve 20. The air bleed valve comprises a cone 26, with an air bleed orifice 28. The air bleed orifice 28 is in fluid communication with the interior of the cone 26, which is in fluid communication with the cap orifice 24. FIG. 3 shows the reservoir cap and bleed valve in generally upright orientation. When turned upside down, e.g. when the cap 19 is under the valve 20, fluid may attempt to travel from the reservoir out the cap orifice 24. However, the air bleed valve's cone shape, will effectively direct most fluid away from the cap orifice 24, thereby preventing excessive fluid leakage out of the cap orifice 24 when the brush is used upside down, or on its side.

Figure 4:
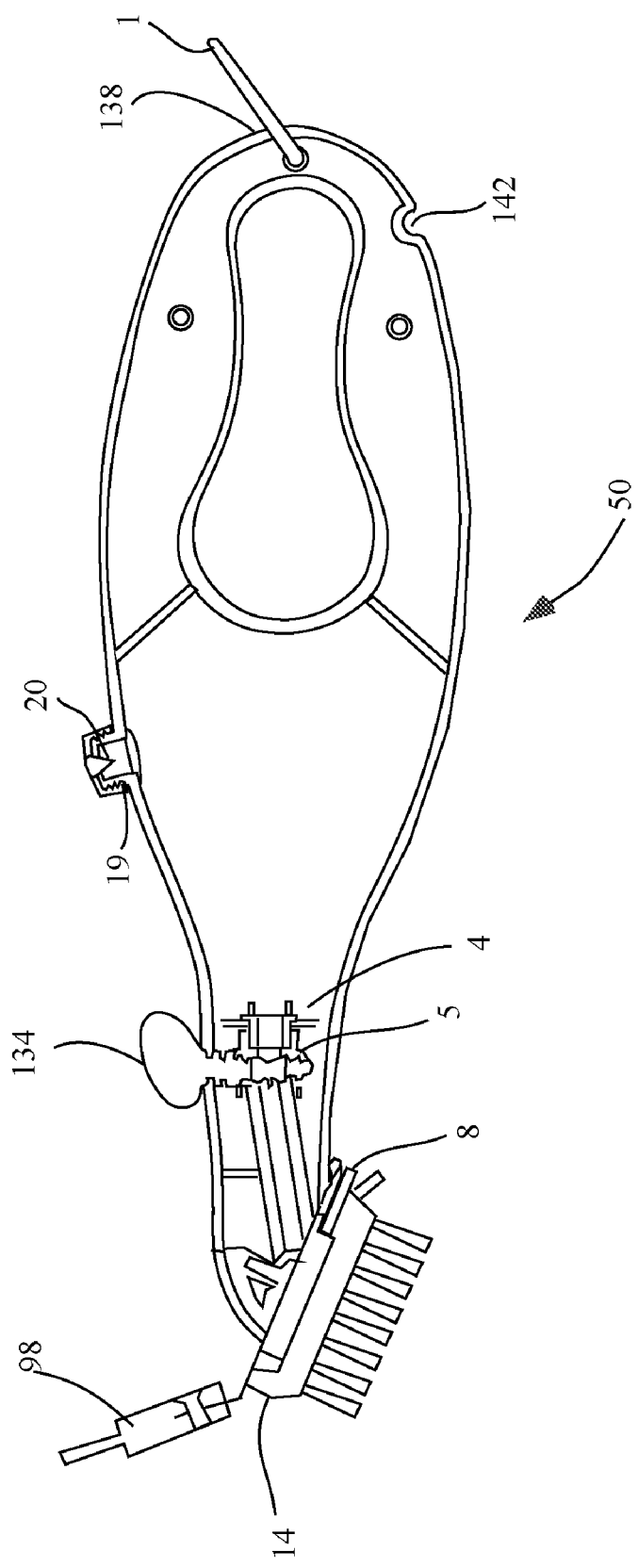
FIG. 4 is a side cross-sectional view of the grill brush from FIG. 1.

FIG. 4 shows a side cross-sectional view of the grill brush 50.

Figure 5:
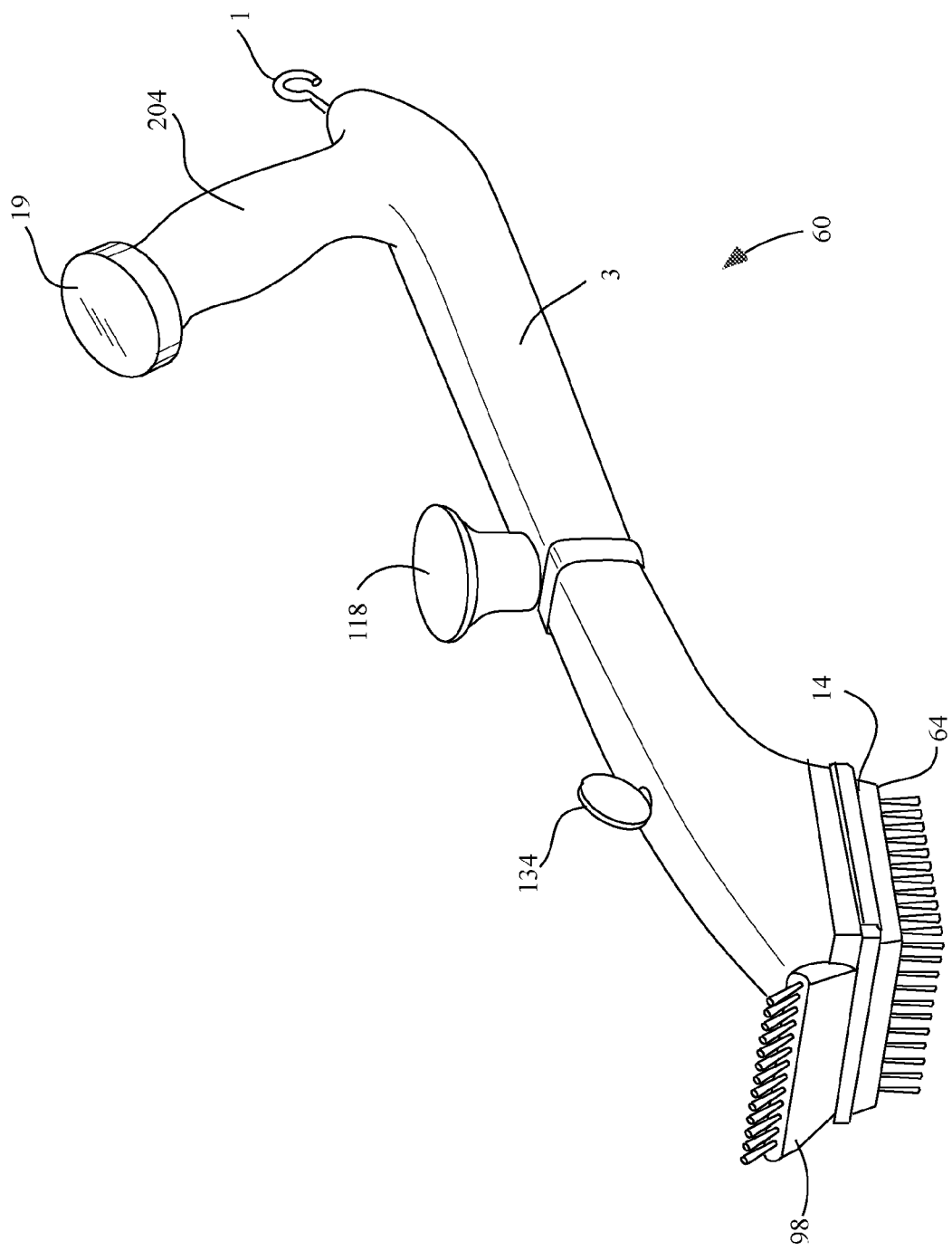
FIG. 5 is a perspective view of another embodiment of the disclosed grill brush.
Figure 6:
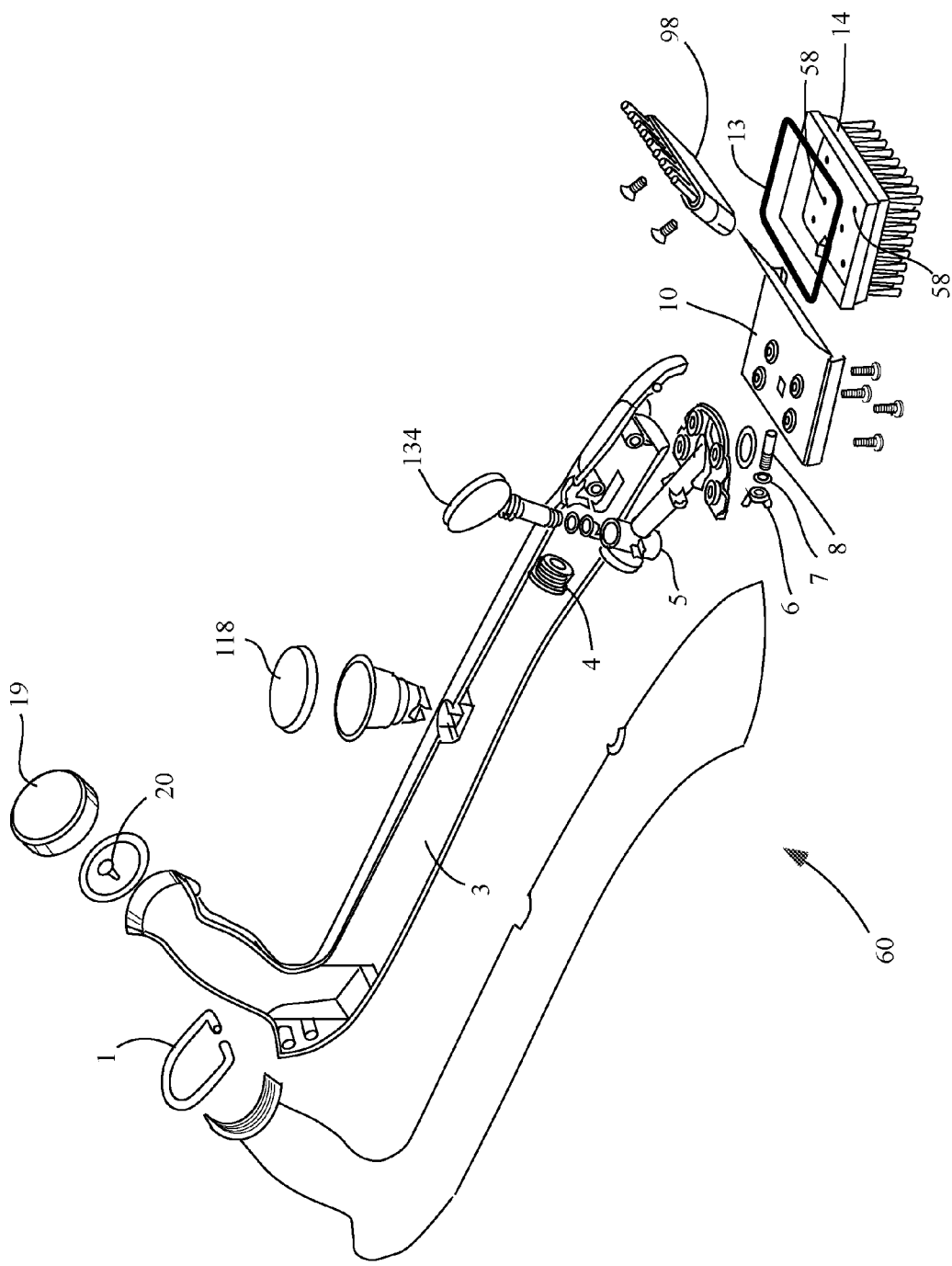
FIG. 6 is an exploded view of the grill brush from FIG. 5.
Figure 7:
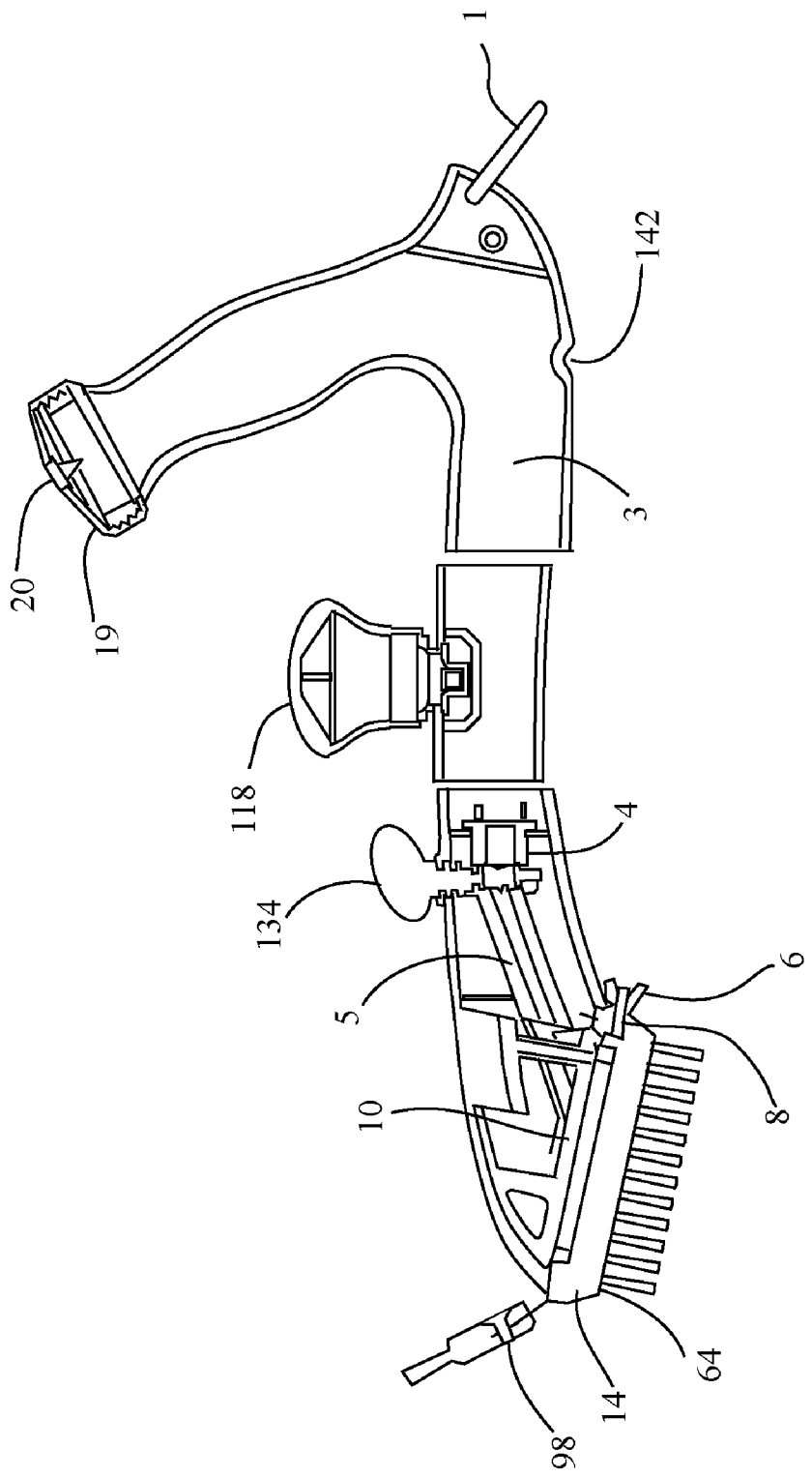
FIG. 7 is a side cross-sectional view of the grill brush from FIG. 5.

FIG. 5 shows another embodiment of a grill brush 60. This embodiment may be called a "Grill Daddy". This grill brush has a knob 118 and an elongated handle 3 to assist in applying pressure to the brush 60 when cleaning a grill. The working mechanisms inside the grill brush 60 are similar to those described and shown with respect to FIGS. 1-4. FIG. 6 shows an exploded view of the grill brush 60. FIG. 7 shows a side cross-sectional view of the grill brush 60. FIG. 5 shows the brush with a stationary hook 1, and FIGS. 6, 7 show the brush 60 with a rotatable hook 1, with an indentation 142 for hook 1 storage. This embodiment of the grill brush 60 does not have an opening in the handle 3 (whereas the grill brush 50 of FIG. 1 does have an opening 200). This grill brush handle 3 has knob 118, and an extended member 204. A user may hold on to either one or both the knob, or extended member, in order to apply more cleaning force onto a grill that is being cleaned with the grill brush.

Figure 8:
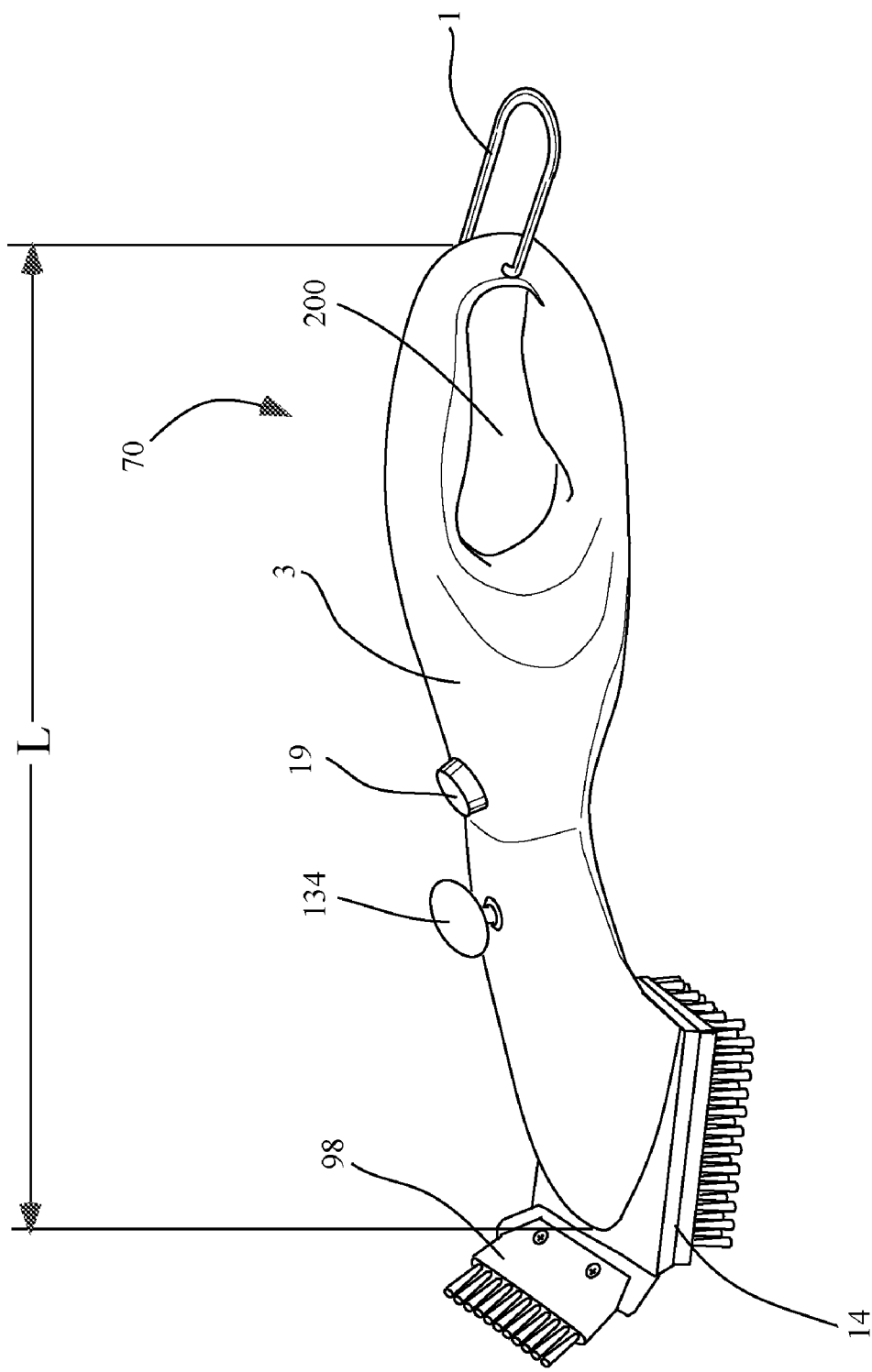
FIG. 8 is a perspective view of another embodiment of the disclosed grill brush, where the opening in the handle is located along about ⅓ of the length of the brush handle.

FIG. 8 shows another embodiment of a grill brush 70. This embodiment may be called a "Grill Lady". The working mechanisms inside the grill brush 60 are similar to those described and shown with respect to FIGS. 1-4. This embodiment of the grill brush 70 has large opening 200 in the handle 3. The opening 200 is configured to allow a user to insert his fingers into the opening and grip the handle 3. The grill brush handle 3 length may be such that the opening 200 extends to about one third or less of the length "L" of the handle 3.

It should be noted that the terms "first", "second", and "third", and the like may be used herein to modify elements performing similar and/or analogous functions. These modifiers do not imply a spatial, sequential, or hierarchical order to the modified elements unless specifically stated.

While the disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of this document.

What is claimed is:

1. A grill brush comprising:
   a handle, with a handle end and a brush head end;
   a hanging means attached to the handle end of the handle;
   a reservoir located within the handle;
   a reservoir cap located on the handle;
   a brush head attached to the brush head end of the handle;
      the brush head comprising:
      a brush head bracket,
      a bristle base;
      a plurality of orifices for fluid distribution located in the bristle base;
      a plurality of bristles located on the bristle base;
   a scraper attached to the brush head;
   a distribution passageway in the handle, and in fluid communication with the plurality of orifices;
   an inlet valve located in the handle, and in fluid communication with the reservoir and the distribution passageway
   a shut-off spool located on the handle, and in operable communication with the inlet valve;
   an anchor attached to the bristle base;
   a hole located in the brush head bracket configured to slide over the anchor;
   an attaching means attachable to the anchor, and configured to hold the bristle base to the brush head bracket;
   a gasket configured to fit between the bristle base and the brush head bracket, and further configured to prevent leaking of fluid from the brush head other than the orifices;
   an air bleed valve located in the reservoir cap;
   an o-ring gasket configured to fit between the distribution passage way and the brush head bracket, and further configured to prevent the leakage of fluid from the intersection of distribution passage way and the brush head bracket.

2. The grill brush of claim 1, wherein the handle further comprises an opening configured to allow a user to stick the user's fingers into the opening in order to hold on to the handle.

3. The grill brush of claim 2, wherein the length of the handle is such that the opening extends for about one half the length of the handle.

4. The grill brush of claim 2, wherein the length of the handle is such that the opening extends for about one third the length of the handle.

5. The grill brush of claim 2, wherein the length of the handle is such that the opening extends for about one fourth the length of the handle.

6. The grill brush of claim 1, wherein the air bleed valve comprises:
   a cone, the cone having an interior and an exterior;
   an air bleed orifice located at the apex of the cone, wherein the air bleed orifice is in fluid communication with the interior of the cone;

an orifice located in the reservoir cap, and wherein the reservoir cap orifice is in fluid communication with the interior of the cone.

7. The grill brush of claim 1, wherein the attaching means is a stationary hook.

8. The grill brush of claim 1, wherein the attaching means is a rotatable hook.

9. The grill brush of claim 8, wherein the handle further comprises an indentation configured to removeably hold the rotatable hook.

\* \* \* \* \*